United States Patent
Nakayama et al.

(10) Patent No.: US 9,858,019 B2
(45) Date of Patent: Jan. 2, 2018

(54) IMAGE FORMING APPARATUS, IMAGE FORMING METHOD, AND NON-TRANSITORY COMPUTER READABLE MEDIUM THAT GENERATES A WARNING BASED ON A PRINT DOCUMENT AND PRINT SETTINGS

(71) Applicant: FUJI XEROX CO., LTD., Tokyo (JP)

(72) Inventors: Hiroyoshi Nakayama, Kanagawa (JP); Yoshihiro Chida, Kanagawa (JP); Masatake Kawabe, Kanagawa (JP); Ryohei Iwasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/989,163

(22) Filed: Jan. 6, 2016

(65) Prior Publication Data
US 2017/0060504 A1 Mar. 2, 2017

(30) Foreign Application Priority Data
Aug. 24, 2015 (JP) .................................. 2015-165087

(51) Int. Cl.
*G06F 3/12* (2006.01)
*H04N 1/00* (2006.01)

(52) U.S. Cl.
CPC .......... *G06F 3/1257* (2013.01); *G06F 3/1205* (2013.01); *G06F 3/1208* (2013.01); *G06F 3/1273* (2013.01); *G06F 3/1285* (2013.01); *H04N 1/00477* (2013.01); *H04N 2201/0082* (2013.01)

(58) Field of Classification Search
CPC .... G06F 3/1257; G06F 3/1205; G06F 3/1273; H04N 1/00477

USPC ................................ 358/1.16, 2.1; 715/229
See application file for complete search history.

(56) References Cited

U.S. PATENT DOCUMENTS

| 9,216,591 B1* | 12/2015 | Rozier | G06F 3/1219 |
| 2005/0248800 A1* | 11/2005 | Choi | G06F 3/1204 358/1.13 |
| 2006/0285142 A1* | 12/2006 | Cho | G06F 3/1205 358/1.13 |

(Continued)

FOREIGN PATENT DOCUMENTS

| JP | 2001-001596 A | 1/2001 |
| JP | 2009-140429 A | 6/2009 |

OTHER PUBLICATIONS

Dec. 22, 2016 Search Report issued in European Patent Application No. 16159365.2.

(Continued)

*Primary Examiner* — Jamares Q Washington
(74) *Attorney, Agent, or Firm* — Oliff PLC

(57) ABSTRACT

An image forming apparatus includes a memory and a warning unit. The memory stores information indicating a past document that has been processed for printing in the past and a past print setting that is a print setting used when the past document has been processed for printing in association with each other. The warning unit outputs a warning to a user in a case where a present document that is presently processed for printing is identical or similar to the past document, and a present print setting that is a print setting set for the present document is different from the past print setting for the past document.

15 Claims, 6 Drawing Sheets

(56) References Cited

U.S. PATENT DOCUMENTS

2011/0317210 A1* 12/2011 Toyama ................ G06F 3/1218
                                                            358/1.15
2012/0327463 A1* 12/2012 Mizuno .................. G06F 3/122
                                                            358/1.15

OTHER PUBLICATIONS

Dec. 22, 2016 Written Opinion issued in European Patent Application No. 16159365.2.

* cited by examiner

FIG. 3

| DOCUMENT COMPARISON SETTINGS | |
|---|---|
| ☑ DOCUMENT NAME | ☐ THUMBNAIL |
| RULE (REGULAR EXPRESSION) | NUMBER OF PAGES ☐ |
| *ABC*.pdf | MATCH RATE (%) ☐ |

COMPARISON CATEGORY SETTINGS
- ☑ JOB SETTINGS
- ☑ IMAGE QUALITY SETTINGS
- ☐ LAYOUT SETTINGS
- ☐ FORM/PAGE NUMBER SETTINGS
- ☐ COLOR SETTINGS

- ☐ SHEET SETTINGS
- ☐ OUTPUT SETTINGS

- ☐ CUSTOM SETTINGS

IMAGE FORMING APPARATUS, IMAGE FORMING METHOD, AND NON-TRANSITORY COMPUTER READABLE MEDIUM THAT GENERATES A WARNING BASED ON A PRINT DOCUMENT AND PRINT SETTINGS

CROSS-REFERENCE TO RELATED APPLICATIONS

This application is based on and claims priority under 35 USC 119 from Japanese Patent Application No. 2015-165087 filed Aug. 24, 2015.

BACKGROUND (i) Technical Field

The present invention relates to an image forming apparatus, an image forming method, and a non-transitory computer readable medium.

(ii) Related Art

Image forming apparatuses, such as printers and multifunction machines, are apparatuses that perform print processes on the basis of input print jobs. Upon print processing by an image forming apparatus, a user or the like specifies print settings (print conditions) for a document to be printed. Print settings include various settings, such as image quality settings, print layout settings, and so on.

Print settings may have a substantial impact on the result of printing. Depending on the settings, the result of printing may be one that is not intended by the user.

Accordingly, a technique for assisting operations for setting print settings has been proposed.

SUMMARY

According to an aspect of the invention, there is provided an image forming apparatus including a memory and a warning unit. The memory stores information indicating a past document that has been processed for printing in the past and a past print setting that is a print setting used when the past document has been processed for printing in association with each other. The warning unit outputs a warning to a user in a case where a present document that is presently processed for printing is identical or similar to the past document, and a present print setting that is a print setting set for the present document is different from the past print setting for the past document.

BRIEF DESCRIPTION OF THE DRAWINGS

An exemplary embodiment of the present invention will be described in detail based on the following figures, wherein:

FIG. 3 is a diagram illustrating an example of an input screen for comparison setting information;

DETAILED DESCRIPTION

Hereinafter, an exemplary embodiment of the present invention will be described with reference to the drawings.

Figure 1:
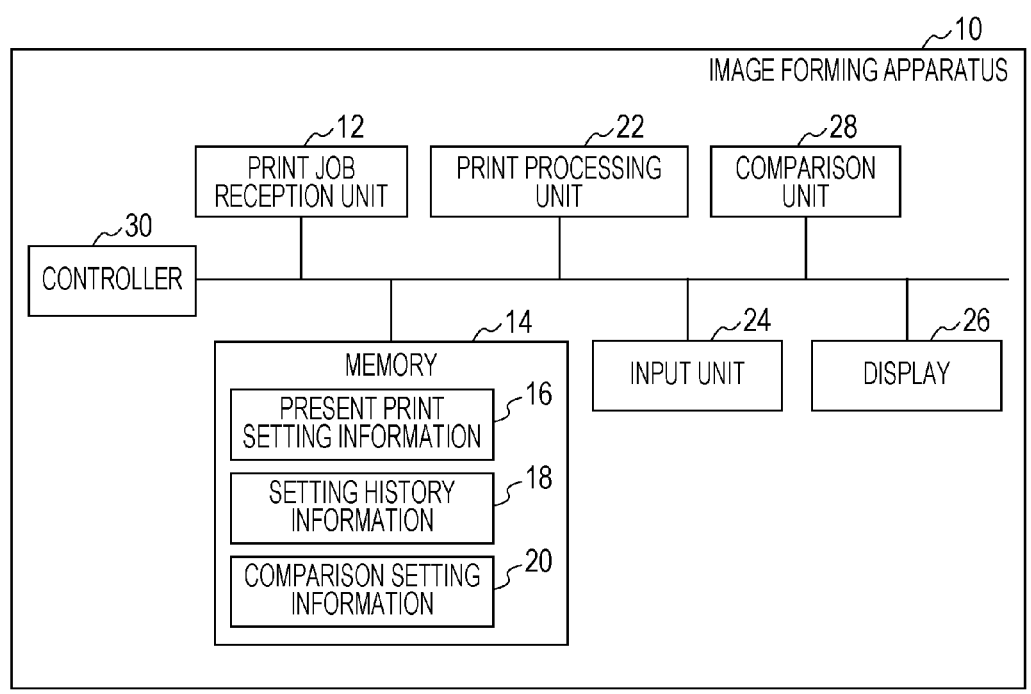
FIG. 1 is a schematic diagram illustrating a configuration of an image forming apparatus according to an exemplary embodiment.

FIG. 1 is a schematic diagram illustrating a configuration of an image forming apparatus 10 according to this exemplary embodiment.

A print job reception unit 12 receives print jobs from other terminals or the like. The print job reception unit 12 includes a communication unit, such as a local area network (LAN) card or an external connection interface, and receives print jobs from terminals that are connected to the image forming apparatus 10 over a network, for example. A print job is data obtained by describing a document to be printed in a page description language (PDL), such as PostScript.

A print job includes information indicating the content of a document to be printed as a matter of course and also includes information indicating a document ID for identifying the document, the document name of the document, a user ID for identifying a user who has input the print job into the image forming apparatus 10, and so on.

A memory 14 is composed of a hard disk, a read-only memory (ROM), a random access memory (RAM), or the like, for example, and stores a program for operating each unit of the image forming apparatus 10, or a print job received by the print job reception unit 12, that is, a print job input into the image forming apparatus 10.

The memory 14 stores present print setting information 16 that indicates print settings (hereinafter referred to as "present print settings") for a document (hereinafter referred to as "present document") on which a print process is presently performed. Prior to the print process on the present document, the present print settings are set by a user, and information indicating the present print settings is stored as the present print setting information 16. The present print setting information 16 remains stored in the memory 14 even after the print process on the present document has been completed. That is, if the present print settings are applicable as is to the next document that is to be printed, a user may make a print process be performed on the next document to be printed without changing the print settings.

The memory 14 also stores setting history information 18 in which past document information indicating a document (hereinafter referred to as "past document") that has been processed for printing in the past by the image forming apparatus 10 is associated with past print setting information indicating print settings (hereinafter referred to as "past print settings") that have been set for the past document. A set of one piece of past document information and one piece of past print setting information is referred to as "record" herein. One record is added in accordance with a user instruction each time one document has been processed for printing. In this way, the setting history information 18 is created.

Further, the memory 14 stores comparison setting information 20 that is referred to by a comparison unit 28 described below. The comparison setting information 20 will also be described below.

A print processing unit 22 includes a raster image processing (RIP) unit, an output unit, and so on, and performs an output process on a document relating to a print job. The RIP unit performs a process (RIP process) for turning a print job described in a PDL into raster data that is recognizable by the output unit. The output unit performs a print process for reproducing a print job that has been turned into raster data by the RIP unit on a print medium, such as paper. The output unit is composed of members included in a general printer, namely, a toner, a photoconductor drum, a paper feeder, and so on. The print processing unit 22 performs an output process in accordance with print settings (print conditions) indicated by the present print setting information 16.

An input unit 24 includes a touch panel, a button, and so on, for example, and is provided for inputting a user instruction into the image forming apparatus 10.

A display 26 includes a liquid crystal panel, for example, and is provided for displaying various types of information. For example, a print setting input screen for a user to input the present print setting information 16, a comparison setting input screen for a user to input the comparison setting information 20, a warning (notification) to a user, and so on are displayed.

The comparison unit 28 determines prior to an output process performed by the print processing unit 22 whether the present document is a document (hereinafter referred to as "similar document") that is identical or similar to a document that has been printed by the image forming apparatus 10 in the past (that is, a past document). In a case where the present document is a document similar to a past document, the comparison unit 28 performs a process for comparing the present print settings with past print settings, which are print settings used in a print process performed on the past document, in accordance with a method indicated by the comparison setting information 20. In a case where the present document is not a document similar to any past document, that is, in a case where a document similar to the present document has not been printed by the image forming apparatus 10 in the past, the comparison unit 28 compares the present print settings with specific print settings (hereinafter referred to as "default print settings") determined in advance by a user in accordance with a method indicated by the comparison setting information 20. The result of the comparison process is transmitted to a controller 30 described below.

The controller 30 is composed of a central processing unit (CPU) or a microprocessor, for example, and performs control so as to operate each unit of the image forming apparatus 10 in accordance with the program stored in the memory 14. The controller 30 performs a process for displaying a warning on the display 26 in accordance with the result of a comparison process performed by the comparison unit 28. That is, in the image forming apparatus 10, the comparison unit 28 and the controller 30 constitute a warning unit.

Specifically, in a case where the present document is a document similar to a past document and the present print settings are different from the past print settings, which are print settings used in a print process performed on the past document, the controller 30 performs control to display a warning on the display 26. In a case where the present document is not similar to any past document and the present print settings are different from the default print settings, the controller 30 performs control to display a warning on the display 26.

The details of processes performed by the comparison unit 28 and the controller 30 will be described below.

The image forming apparatus 10 has a configuration as described above. Note that the comparison unit 28 may be a function of the controller 30 (that is, the comparison unit 28 may be included in the controller 30).

Figure 2:
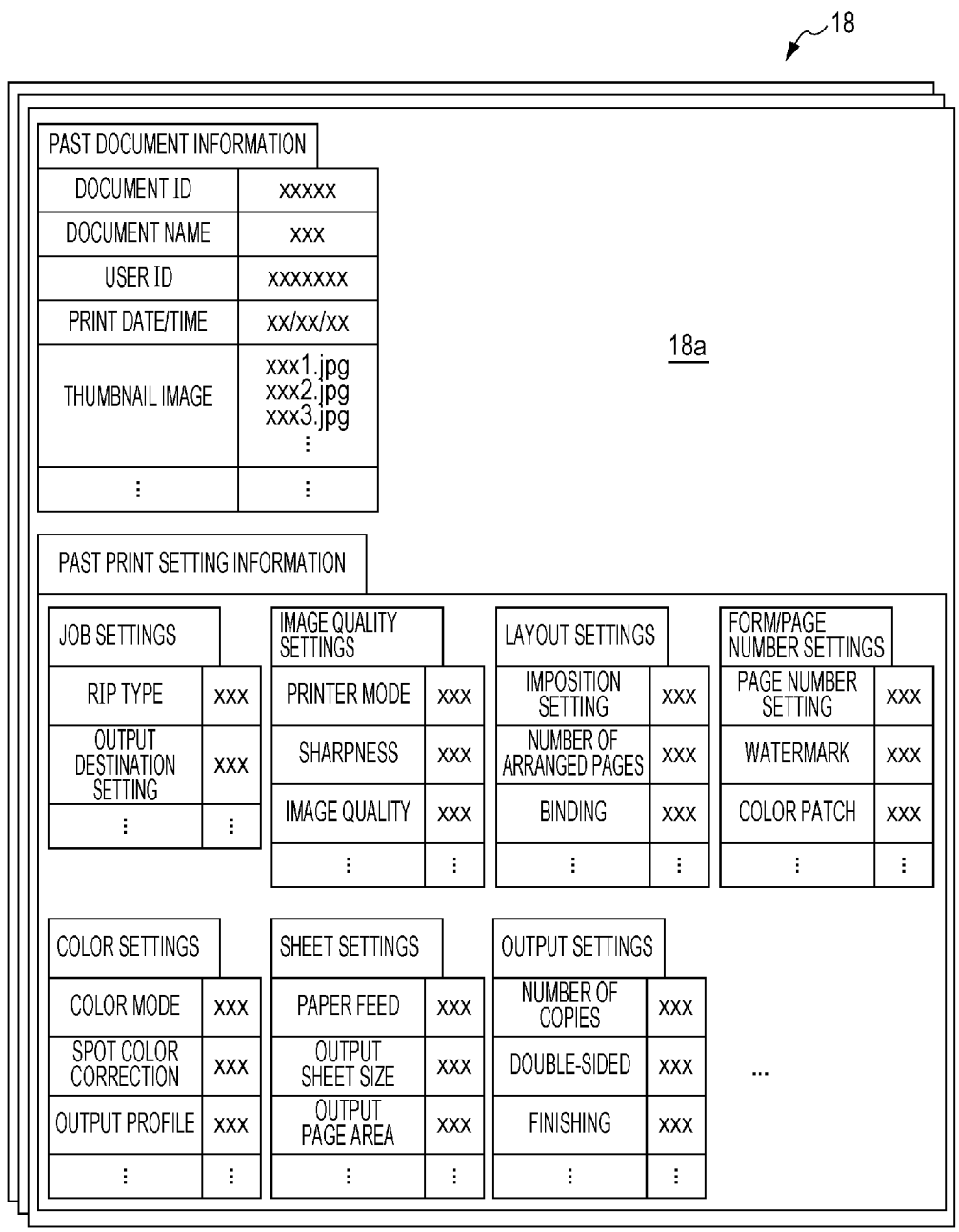
FIG. 2 is a diagram schematically illustrating an example of setting history information.

Hereinafter, the setting history information 18 is described with reference to FIG. 2. FIG. 2 is a diagram schematically illustrating an example of the setting history information 18. FIG. 2 illustrates the content of a record 18a, which is one of plural records included in the setting history information 18. As described above, in the setting history information 18, past document information and past print setting information are associated with each other.

As illustrated in FIG. 2, past document information is information that includes a document ID for uniquely identifying a past document, the document name of the past document, a user ID for identifying a user who has given an instruction for a print process on the past document, information indicating a date and time when an output process was performed on the past document, and thumbnail images of the past document. As a matter of course, other pieces of information may be included in past document information.

These pieces of information included in past document information are information included in the print job. Therefore, past document information is extracted by the controller 30 when the print job relating to the past document is input. Regarding the thumbnail images, images of a predetermined number of pages of the past document are created and stored.

As illustrated in FIG. 2, past print setting information includes plural setting items, and the plural setting items are classified into plural categories. For example, past print setting information includes an "image quality settings" category that includes setting items, such as printer mode and sharpness, a "layout settings" category that includes setting items, such as imposition setting and binding, a "color settings" category that includes setting items, such as color mode and spot color correction, a "sheet settings" category that includes setting items, such as paper feed and output sheet size, and so on. As a matter of course, past print setting information may include other setting items and other categories.

Note that the setting items or categories included in past print setting information are the same as those included in the present print setting information 16. That is, also in the present print setting information 16, values are set for the plural setting items that are classified into categories as in the past print setting information illustrated in FIG. 2.

Hereinafter, the comparison setting information 20 is described with reference to FIG. 3. FIG. 3 is a diagram illustrating an example of an input screen for the comparison setting information 20.

The controller 30 performs control to display a comparison setting information input screen as illustrated in FIG. 3 on the display 26 in response to a user request. The user sets, on the screen, the method for comparing the present document with a past document (that is, the method for determining whether the present document is a document similar to a past document) and setting items that are referred to upon a process of comparing the present print settings with past print settings or the like. These settings are input prior to a print process on the present document, and the input setting information is stored as the comparison setting information 20.

The method for comparing the present document with a past document is selectable from among plural comparison methods. In this exemplary embodiment, a method is selectable from among two methods, namely, a comparison based on document names and a comparison based on thumbnail images. As a matter of course, other methods may be selectable as the method for comparing the documents.

The comparison based on document names is literally a method in which the document name of the present document is compared with that of a past document and determination as to whether the documents are similar documents is performed. Although it may be determined that the documents are similar documents if the document names completely match, a user is able to set a rule of comparing document names in this exemplary embodiment, and the document names are compared with each other in accordance with the rule. For example, the rule is expressed by a regular expression of the document name of the present document, and a past document having a document name that corresponds to the regular expression is determined to be a document similar to the present document. For example, in a case where the document name of the present document is ".ABC(Ver2.00).pdf", a regular expression of the document name, namely, "*ABC*.pdf" may be input as the rule. In a case where the rule is applied, a past document that is a portable document format (pdf) file having a document name which includes "ABC" is determined to be a document that is similar to the present document.

A document name may be regarded as document identification information added to a document. Therefore, as described above, the comparison method based on document names may be regarded as a method of comparing document identification information added to the present document with document identification information added to a past document, thereby determining whether the documents are identical or similar to each other. As document identification information, a document ID for uniquely identifying a document may be used in addition to a document name. In a case of a comparison based on document IDs, determination as to whether the documents completely match each other is performed.

The comparison based on thumbnail images is a method of comparing thumbnail images that are images of at least a part of the present document and that are displayed in reduced size with thumbnail images that are images of at least a part of a past document and that are displayed in reduced size, thereby determining whether the documents are similar to each other. Thumbnail images are compared by using an existing technique. In this exemplary embodiment, a thumbnail image is generated for each page, and a user is able to set the number of pages for which a comparison is to be performed among pages for which thumbnail images have been respectively generated, or a value (match rate) indicating the degree of matching between thumbnails of the present document and thumbnails of a past document, the value being used to determine whether the present document and the past document are similar documents. For example, in a case where the number of pages is set to "3" and the match rate is set to "90%", thumbnail images of predetermined three pages (first three pages in this exemplary embodiment) of the present document and those of a past document are compared with each other and, if the match rate is 90% or higher, the documents are determined to be similar documents.

As described above, the comparison method based on thumbnail images may be regarded as a method of comparing the content of the present document with the content of a past document, thereby determining whether the documents are identical or similar to each other. As a method like this, a method of comparing sentences included in the present document with sentences included in a past document (the number of characters to be compared may be set as appropriate) or the like may be used in addition to the comparison based on thumbnail images.

On the input screen illustrated in FIG. 3, a user may check both the document name and the thumbnail. In this case, if the document name of a past document matches a regular expression of the document name of the present document and if the match rate is equal to or higher than a predetermined value as a result of a comparison of thumbnail images between the past document and the present document, the documents are determined to be similar documents.

In the comparison category settings, categories or setting items to be compared in a process of comparing print settings for a past document that is determined to be a document similar to the present document or default print settings (hereinafter referred to as "comparison target settings") with the present print settings are specified. For example, on the input screen as illustrated in FIG. 3, in a case where the "job settings" category and the "image quality settings" category are checked, only values that are set for setting items included in the "job settings" category and in the "image quality settings" category are compared in a comparison between the present print settings and comparison target settings. As a matter of course, a user may check all categories so as to include all setting items in comparison targets or may uncheck all categories so as to perform no comparison process, that is, to display no warning about the present print settings.

With the "custom settings" in the comparison category settings, it is possible to specify a setting item that is to be included in comparison targets on a per setting-item basis instead of on a per category basis. When a user checks the check box corresponding to "custom settings", the screen switches to another screen, all setting items included in each category are displayed, and a user is able to specify, for each of the setting items, whether the setting item is to be included in target items for comparison processing.

The plural categories included in the comparison category settings may be classified into a first category group that has a relatively substantial impact on the result of printing and a second category group that has a relatively little impact on the result of printing (at least has an impact less than an impact made by any category included in the first category group). Such a process of classification may be performed by a user or an administrator. In this exemplary embodiment, the categories of "job settings", "image quality settings", "layout settings", "form/page number settings", and "color settings" are included in the first category group, and the categories of "sheet settings" and "output settings" are included in the second category group.

The first category group has a substantial impact on the result of printing, and therefore, a limitation may be put so as to make the categories included in the first category group be always specified as categories to be included in comparison targets or so as to allow only an administrator of the image forming apparatus 10 to uncheck a category included in the first category group (that is, to exclude a category included in the first category from comparison targets). Even in such a case, a general user is able to uncheck any category included in the second category group as desired.

Figure 4:
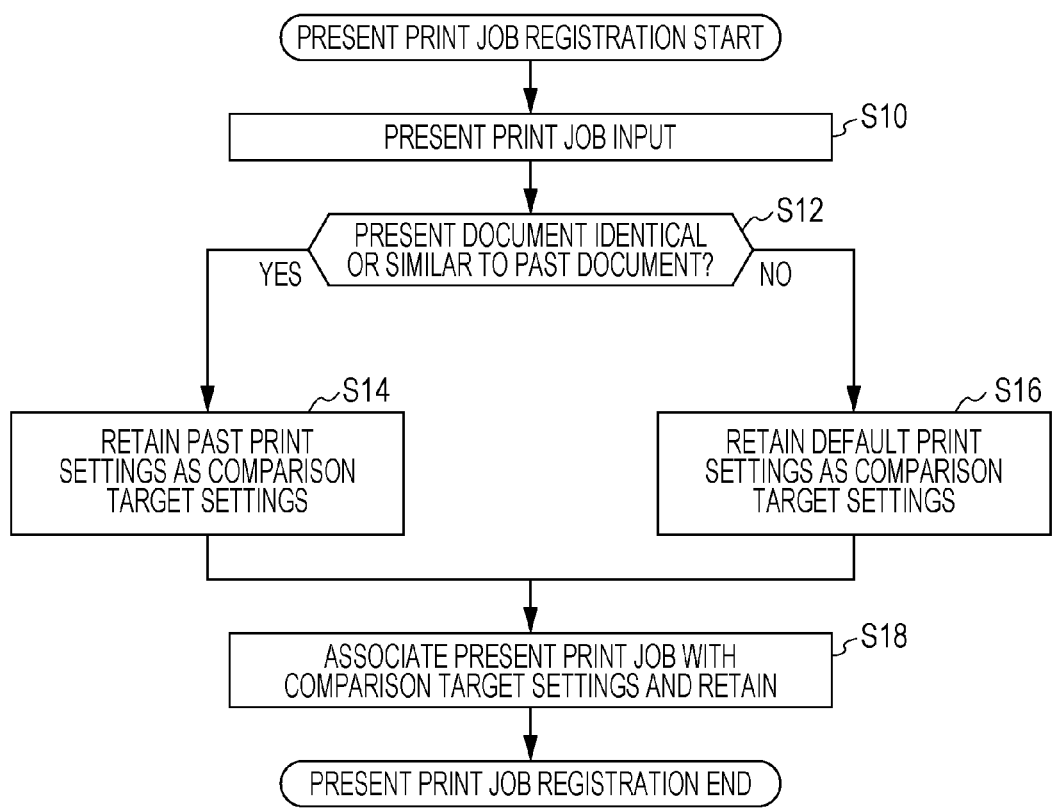
FIG. 4 is a flowchart illustrating a flow of a print job registration process in the image forming apparatus according to the exemplary embodiment.
Figure 5:
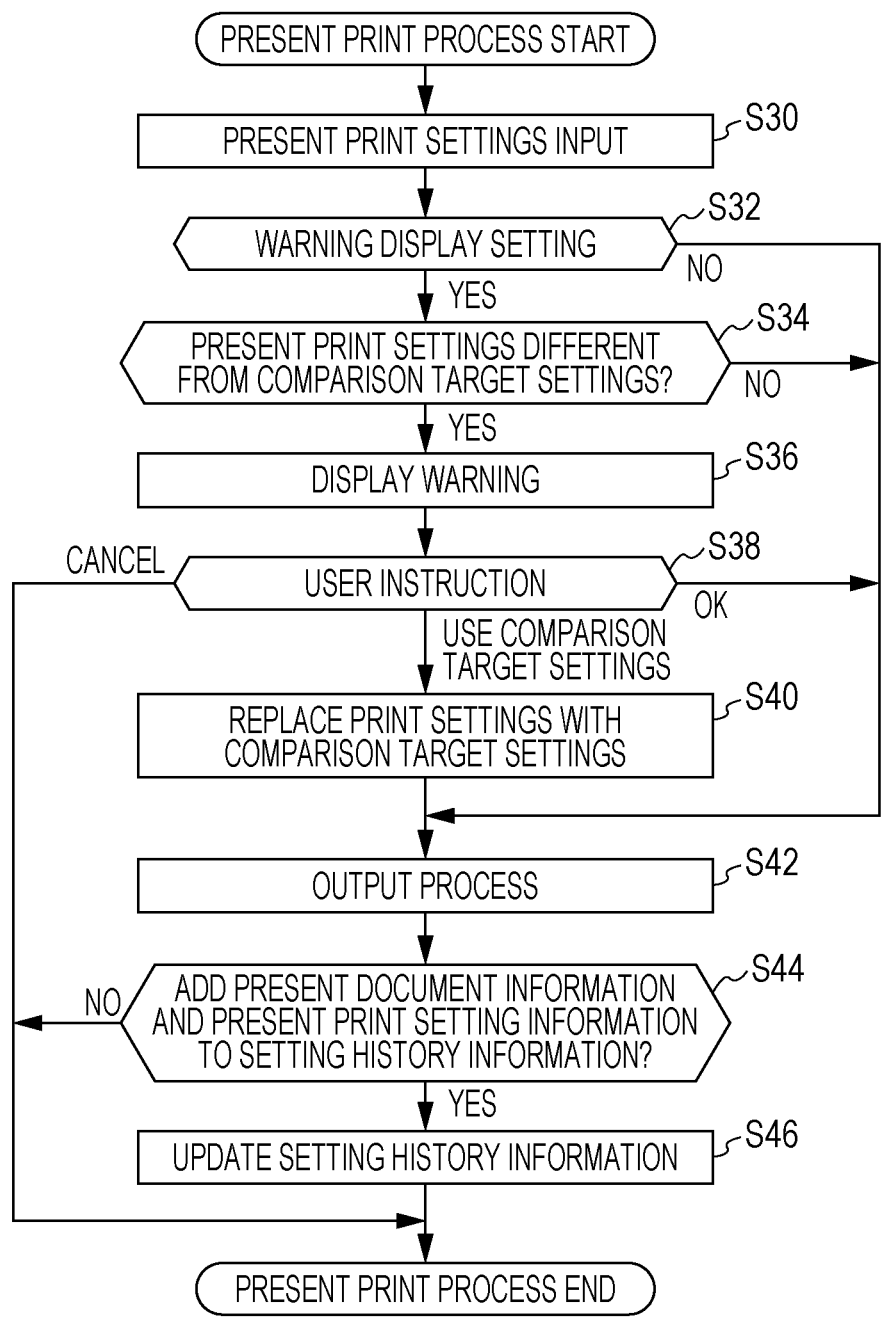
FIG. 5 is a flowchart illustrating a flow of a print process in the image forming apparatus according to the exemplary embodiment.

Hereinafter, a flow of a process performed by the image forming apparatus 10 is described with reference to the flowcharts in FIGS. 4 and 5. First, a present print job registration process is described with reference to the flowchart in FIG. 4.

In step S10, the print job reception unit 12 receives a print job relating to the present document from another terminal or the like. That is, a print job relating to the present document is input into the image forming apparatus 10. It is assumed that the document name of the present document is ".ABC(Ver2.00).pdf".

In step S12, the comparison unit 28 determines whether the present document and a past document are similar documents by using a method indicated by the comparison setting information 20.

In a case where the comparison method indicated by the comparison setting information 20 is based on document names and the rule is set to "*ABC*.pdf", the comparison unit 28 searches the setting history information 18 for a record including a document name that matches the regular expression "*ABC*.pdf" as past document information. If such a record is extracted, the present document is determined to be a document similar to a document that has been processed for printing in the past (that is, a past document), and the flow proceeds to step S14. Otherwise, the flow proceeds to step S16.

In a case where the comparison method indicated by the comparison setting information 20 is based on thumbnails, the number of pages is set to "3", and the match rate is set to "90%", the comparison unit 28 compares the thumbnail images of the first three pages of the present document with the thumbnail images of the first three pages in each record included in the setting history information 18 one by one. If a record having the match rate of 90% or higher is extracted as a result of comparing the images, the present document is determined to be a document similar to a document that has been processed for printing in the past (that is, a past document), and the flow proceeds to step S14. Otherwise, the flow proceeds to step S16.

In step S14, the controller 30 performs control to retain past print setting information in the record extracted by the comparison unit 28 in step S12 as comparison target settings, that is, performs control to store the past print setting information temporarily in the memory 14.

In step S16, that is, in a case where the present document is not similar to any document that has been printed by the image forming apparatus 10 in the past, the controller 30 performs control to retain default print settings set in advance by a user as comparison target settings.

In step S18, the controller 30 performs control to store the present print job temporarily and the comparison target settings retained in step S14 or S16 in the memory 14 in association with each other.

By performing the process described above, the present print job registration process is completed. Subsequently, the image forming apparatus 10 starts a present print job print process in response to a print instruction from a user. FIG. 5 illustrates a flowchart of the print process.

In step S30, a user inputs print settings for the present document, that is, inputs present print settings.

The print information that has been input is stored in the memory 14 as the present print setting information 16. Print settings used in the previous print process remain stored as the present print setting information 16, and therefore, the user need not input anything if the print settings are also applicable as is to the present document. In either case, print settings for the present document are stored as the present print setting information 16 in the process in step S30.

In the process in step S32, the controller 30 determines the state of a warning display setting. Specifically, the controller 30 refers to the comparison setting information 20 and determines whether at least one category is selected in the comparison category settings. If at least any one category is selected, the controller 30 determines that the warning display setting is set to "yes", and the flow proceeds to step S34. If none of the categories is selected, the controller 30 determines that the warning display setting is set to "no", and the flow proceeds to step S42. That is, a print process on the present print job is performed without displaying any warning about the present print settings.

In step S34, the comparison unit 28 compares the present print settings with the comparison target settings and determines whether there is any difference between the present print settings and the comparison target settings. The comparison unit 28 refers to the selection states of the comparison target categories (or setting items) included in the comparison setting information 20 and compares the value set for each selected category (or setting item) in the present print settings with that in the comparison target settings. If any difference is found between the present print settings and the comparison target settings as a result of the comparison process, the flow proceeds to step S36. Otherwise, the flow proceeds to step S42.

Figure 6:
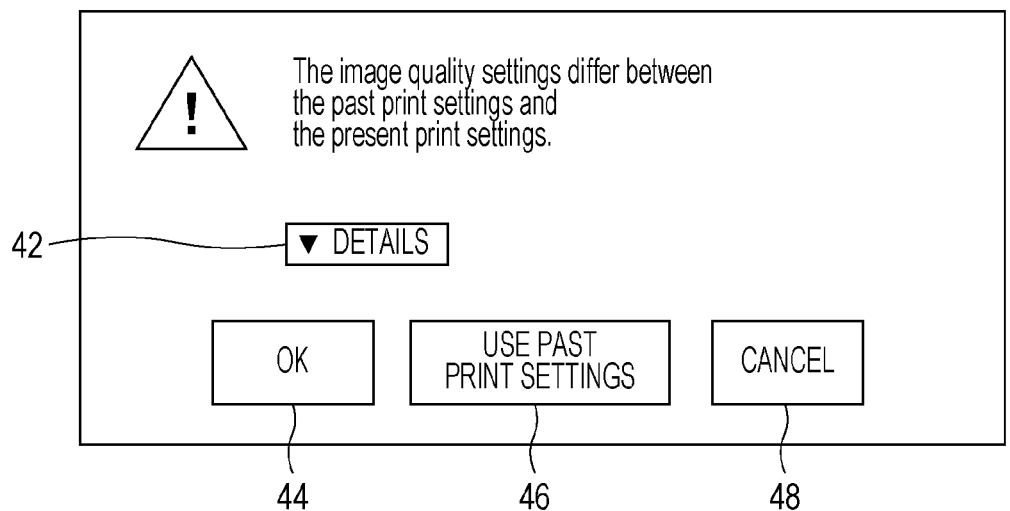
FIG. 6 is a diagram illustrating an example of a warning display.

In step S36, the controller 30 performs control to display a warning on the display 26 on the basis of the result of the comparison process performed by the comparison unit 28. FIG. 6 illustrates an example of a warning display. Note that the example in FIG. 6 is an example of a warning displayed in a case where past print settings are retained as comparison target settings. As illustrated in FIG. 6, as a warning, a pop-up 40 indicating that a difference is found between the present print settings and the comparison target settings (the past print settings retained in step S14 in this case) and indicating a category in which the difference is found among the print settings is displayed. In the example in FIG. 6, the pop-up 40 indicates that a difference is found in a setting item included in the "image quality settings" category. The pop-up 40 further includes a detail button 42. When a user taps the detail button 42, the setting item in the "image quality settings" category in which a difference is found is indicated.

The pop-up 40 includes buttons for selecting a process to be performed on the present document together with the warning to the user. Specifically, the pop-up 40 includes an OK button 44 for printing the present document by using the present print settings, a setting change button 46 for overwriting the print settings with the comparison target settings and thereafter printing the present document, and a cancel button 48 for cancelling the print job relating to the present document, that is, for discontinuing the print process.

In step S38, the controller 30 determines which instruction has been input by the user.

If an instruction for canceling the print job relating to the present document has been received from the user, that is, if the user has tapped the cancel button 48, a print process is not performed, and the process for the print job relating to the present document ends. If an instruction for performing a process for printing the present document by using the present print settings has been received from the user, that is, if the user has tapped the OK button 44, the flow proceeds to step S42, and the process for printing the present job is performed by using the present print settings. If an instruction for overwriting the print settings with past print settings and thereafter performing a process for printing the present document has been received from the user, that is, if the user has tapped the setting change button 46, the flow proceeds to step S40.

In step S40, the controller 30 performs a process of replacing the present print settings with the comparison target settings (past print settings in this case) temporarily retained in the memory 14. By performing this process, the comparison target settings that are temporarily retained are stored as the present print setting information 16.

In step S42, the print processing unit 22 performs an output process on the present print job in accordance with print settings indicated by the present print setting information 16.

In step S44, the controller 30 determines whether present document information about the present document and the present print setting information 16 are to be added to the setting history information 18. This determination is performed in accordance with a user instruction. For example, after the output process, the controller 30 performs control to display on the display 26 a screen for asking the user whether the present print setting information 16 is to be added to the setting history information 18 and makes the user input an instruction. If the user gives an instruction for addition to the setting history information 18, the flow proceeds to step S46. Otherwise, the print job relating to the present document ends without adding the present print setting information 16 to the setting history information 18.

In step S46, the controller 30 extracts present document information (including the document ID, document name, thumbnail images, and so on of the present document) about the present document from the print job relating to the present document temporarily stored in the memory 14 and adds, to the setting history information 18, a new record in which the present document information is associated with the present print setting information 16. By adding a record to the setting history information 18 in accordance with a user instruction, it is possible to suppress registration of a record that is not appropriate as a history in a case where printing is performed using special print settings, for example.

The flow of the process performed by the image forming apparatus 10 is as described above.

According to this exemplary embodiment, in a case where the present document is a document similar to a past document (that is, the present document is a document similar to a document that has been processed for printing in the past by the image forming apparatus 10) and the present print settings are different from past print settings that are set for the past document, a warning is output to the user prior to an output process on the present document. Accordingly, the user may know prior to an output process that print settings that are set for the document which is presently printed are different from print settings used in printing of a similar document in the past. As a result, the user may take an appropriate action, such as applying past print settings, to the present print process, for example.

According to this exemplary embodiment, past document information, which is information indicating a document printed in the past by the image forming apparatus 10, and past print setting information relating to the document are accumulated and stored as the setting history information 18 in association with each other. By storing the setting history information 18, it is possible to determine whether the present document is a document similar to a past document and it is also possible for the user, in a case where the present print settings are different from print settings for a similar past document, to retrieve the past print settings included in the setting history information 18 with a simple operation (by only tapping the setting change button 46) and to set the retrieved print settings as the present print settings.

According to this exemplary embodiment, in a case where the present print settings are different from print settings for a similar past document, a warning is displayed to a user, and a setting item that differs between the present print settings and the past print settings is indicated. Accordingly, the user may take an action appropriate to the setting item having different values for the print job relating to the present document.

The plural categories or the plural setting items included in print settings may include a category or a setting item that has no substantial impact on the result of printing. Such a category or a setting item may change depending on the environment in which the image forming apparatus 10 is used. According to this exemplary embodiment, in a process of comparing the present print settings with past print settings, it is possible to select categories or setting items that are to be included in comparison targets as appropriate. Therefore, the user may make a comparison process be performed only on necessary categories or setting items as appropriate.

Even in a case where the present document and a past document do not completely match each other, the present document is to be printed by using past print settings set for the past document in some cases. For example, in the case of reprinting described above, a typographical error may be corrected, an image is replaced, or other corrections are made to a past document. In such a case, although the past document, which is a document before correction, is a document different from the present document, which is a document after correction, it is desired that print settings for the past document and those for the present document are identical to each other so as to produce the same printing results for both the documents.

According to this exemplary embodiment, in a case where the present document is compared with a past document on the basis of the document names, determination as to whether the document name of the past document matches a regular expression of the document name of the present document is performed. Therefore, even if a correction is made to a past document, for example, and a version name included in the document name is changed or characters "corrected version" or the like are added to the document name, it is possible to compare the documents with each other by excluding the version name or the added characters. In a case of comparing the documents with each other on the basis of thumbnail images, the user is able to change the match rate as appropriate, that is, the user is able to set, as appropriate, the scope (similarity scope) based on which determination as to whether the present document and the past document are similar documents is performed. As a result, even in a case where the content of the present document is slightly different from that of the past document, if the present document is to be printed using print settings similar to those for the past document, it is possible to determine that the documents are similar documents. That is, a warning is displayed to the user in a case where the present print settings are different from the past print settings.

According to this exemplary embodiment, in a case where the present document is not a document similar to any document that has been printed in the past by the image forming apparatus 10, the default print settings set in advance by a user is compared with the present print settings and, if there is a difference between the default print settings and the present print settings, it is possible to display a warning to the user. This is applicable to an environment in which similar documents are not repeatedly printed, that is, a large number of different documents are printed, and in which a print process is to be performed for each document using the same print settings. In such an environment, if desired print settings are specified as the default print settings, it is possible to display a warning to the user in a case where print settings different from the default print settings are input for each document.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a memory that stores, in association with each other, information indicating a past document that has been processed for printing in the past and a past print setting that is a print setting used when the past document was processed for printing; and
   a processor configured to act as a warning unit that outputs a warning to a user when a present document that is presently processed for printing is identical or similar to the past document, and a present print setting that is a print setting set for the present document is different from the past print setting for the past document,
   wherein the processor compares the past print setting for the past document and the present print setting for the present document, and based on the comparison, the warning indicates that at least one setting item of the present print setting is different from the at least one setting item of the past print setting, and
   wherein a user inputs: (i) document comparison settings for comparing the present document with the past document; and (ii) comparison setting information including the at least one setting item that is to be referred to upon comparison of the present print setting with the past print setting.

2. The image forming apparatus according to claim 1, wherein
   the print setting includes a plurality of setting items, and
   the warning unit outputs the warning when a value set for a setting item specified in advance in the present print setting is different from a value set for the setting item in the past print setting.

3. The image forming apparatus according to claim 1, wherein
   the warning unit determines whether the present document is identical or similar to the past document by comparing document identification information added to the present document with document identification information added to the past document.

4. The image forming apparatus according to claim 2, wherein
   the warning unit determines whether the present document is identical or similar to the past document by comparing document identification information added to the present document with document identification information added to the past document.

5. The image forming apparatus according to claim 1, wherein
   the warning unit determines whether the present document is identical or similar to the past document by comparing content of the present document with content of the past document.

6. The image forming apparatus according to claim 2, wherein
   the warning unit determines whether the present document is identical or similar to the past document by comparing content of the present document with content of the past document.

7. The image forming apparatus according to claim 1, wherein
   the warning unit outputs the warning to the user when the present document is not identical or similar to the past document and the present print setting is different from a print setting set in advance.

8. The image forming apparatus according to claim 2, wherein
   the warning unit outputs the warning to the user when the present document is not identical or similar to the past document and the present print setting is different from a print setting set in advance.

9. The image forming apparatus according to claim 3, wherein
   the warning unit outputs the warning to the user when the present document is not identical or similar to the past document and the present print setting is different from a print setting set in advance.

10. The image forming apparatus according to claim 4, wherein
    the warning unit outputs the warning to the user when the present document is not identical or similar to the past document and the present print setting is different from a print setting set in advance.

11. The image forming apparatus according to claim 5, wherein
    the warning unit outputs the warning to the user when the present document is not identical or similar to the past document and the present print setting is different from a print setting set in advance.

12. The image forming apparatus according to claim 6, wherein
    the warning unit outputs the warning to the user when the present document is not identical or similar to the past document and the present print setting is different from a print setting set in advance.

13. An image forming method comprising:
    storing, in association with each other, information indicating a past document that has been processed for printing in the past and a past print setting that is a print setting used when the past document was processed for printing; and
    outputting a warning to a user when a present document that is presently processed for printing is identical or similar to the past document, and a present print setting that is a print setting set for the present document is different from the past print setting for the past document;
    comparing the past print setting for the past document and the present print setting for the present document, and based on the comparison, the warning indicates that at least one setting item of the present print setting is different from the at least one setting item of the past print setting; and
    inputting: (i) document comparison settings for comparing the present document with the past document; and (ii) comparison setting information including the at least one setting item that is to be referred to upon comparison of the present print setting with the past print setting.

14. A non-transitory computer readable medium storing a program causing a computer to execute a process for image forming, the process comprising:
  storing, in association with each other, information indicating a past document that has been processed for printing in the past and a past print setting that is a print setting used when the past document was processed for printing; and
  outputting a warning to a user when a present document that is presently processed for printing is identical or similar to the past document, and a present print setting that is a print setting set for the present document is different from the past print setting for the past document;
  comparing the past print setting for the past document and the present print setting for the present document, and based on the comparison, the warning indicates that at least one setting item of the present print setting is different from the at least one setting item of the past print setting; and
  inputting: (i) document comparison settings for comparing the present document with the past document; and (ii) comparison setting information including the at least one setting item that is to be referred to upon comparison of the present print setting with the past print setting.

15. The image forming apparatus according to claim 1, wherein
  the at least one setting item is classified in a category of a plurality of categories, and
  only setting items included in a category specified by the user are referred to when comparing the present print setting with the past print setting.

\* \* \* \* \*